United States Patent [19]

Satokawa

[11] Patent Number: 5,046,317
[45] Date of Patent: Sep. 10, 1991

[54] WASTEGATE VALVE FOR TURBOCHARGER

[75] Inventor: Akira Satokawa, Tokyo, Japan
[73] Assignee: Allied-Signal Inc., Morristown, N.J.
[21] Appl. No.: 500,433
[22] Filed: Mar. 27, 1990
[51] Int. Cl.$^5$ .................... F02D 23/00; F01B 25/02
[52] U.S. Cl. ........................... 60/602; 60/600; 60/601; 60/603; 415/151
[58] Field of Search .............. 60/600, 601, 602, 603; 415/151

[56] References Cited

U.S. PATENT DOCUMENTS 4,982,567  1/1991  Hashimoto et al. ................ 60/600

FOREIGN PATENT DOCUMENTS 1183742  12/1964  Fed. Rep. of Germany .
2948089   4/1981  Fed. Rep. of Germany .
2533629   3/1984  France .
2038940   7/1980  United Kingdom .

Primary Examiner—Leonard E. Smith
Assistant Examiner—Alfred Basichas
Attorney, Agent, or Firm—Ken C. Decker; William N. Antonis

[57] ABSTRACT

A twin wastegate valve for an exhaust gas driven turbocharger in which exhaust gas is communicated to the turbine wheel through separate inlet passages includes a pair of wastegate valve members mounted for pivoting movement relative to a support. The support is pivotally mounted on the actuating arm. Accordingly, small differences in the height of the valve seat caused by wear or by manufacturing tolerances do not affect closure of the valve.

11 Claims, 3 Drawing Sheets

WASTEGATE VALVE FOR TURBOCHARGER

This invention relates to an exhaust gas bypass and wastegate valve arrangement for exhaust gas driven turbochargers and, more specifically to a wastegate valve which opens and closes a bypass outlet port.

Generally, a turbocharger is used to increase the pressure level of the intake combustion air of an internal combustion engine, and is powered by engine exhaust gas pressure. In this case, the level to which the pressure of the intake air is increased during high speed and high load operating ranges of the engine is prevented from becoming excessive to prevent damage to the engine and turbocharger by opening a wastegate valve which normally closes the bypass gas outlet port. Accordingly, when the exhaust gas pressure has exceeded a predetermined value, the wastegate valve is opened thereby discharging the exhaust gas to the exterior.

In turbochargers used on engines with two banks of cylinders, it has been found extremely effective to maintain separate exhaust gas inlet paths by means of a bulkhead in order that separate impulses of the exhaust gases will be transmitted to the turbine wheel. Such turbochargers having divided exhaust gas inlet paths require separate bypass gas outlet ports controlled by a dual wastegate valve mechanism.

In such case where a dual wastegate valve mechanism is provided, however, there has arisen a problem in that simultaneous opening and closing operation of both outlet ports has been hard to accomplish and the wastegate valve mechanisms have been made complicated. In order to solve this problem, it has been suggested that such dual wastegate valve arrangements employ a pair of valve members mounted to a single arm as disclosed in, for example, Japanese Patent Application Laid-Open Publication No. 57-137619 and Japanese Utility Model Application Laid-Open Publication No. 62-183033. In the case of the former, valve members are secured directly to the arm member so as to cause another problem in that even a slight distortion of the arm member results in exhaust gas flowing through the respective outlet port when the outlet port should be closed and eventually results in incapability of transmitting the pressure impulses of the exhaust gas to the turbine wheel at high efficiency. In the latter case, the valve members are coupled to the arm member through a pin for allowing limited displacement of the valve members to accommodate any distortion in the arm member or any differential in valve seat height so that the bypass gas outlet ports are opened and closed concurrently. However, this arrangement causes another problem in that excessive movement is likely to occur between the arm member and the pin holding the valve members on the arm member so as to cause a risk of opening one or both of the valve members before the intake pressure becomes excessive. Accordingly, the pressure impulse of the exhaust gas is not transmitted to the turbine wheel at high efficiency.

An object of the present invention is, therefore, to provide an exhaust gas wastegate valve and bypass arrangement for a turbocharger which is capable of maintaining the wastegate valve members tightly on their valve seats even if the arm member and valve seats are distorted or if excessive tolerances are present between the respective bypass gas outlet ports so that pressure impulses of the exhaust gases are transmitted to the turbine wheel highly efficiently.

The above object is attained by means of an exhaust gas bypass and wastegate valve arrangement for a turbocharger comprising a pair of divided gas inlet paths for feeding exhaust gases from an internal combustion engine to a turbine wheel, a bypass passage communicating with the gas inlet paths through a pair of bypass gas outlet ports, a pair of wastegate valve members seatable on valve seats at the bypass gas outlet ports, a valve support carrying the valve members through mounting members mounted to the support at a symmetrical position with respect thereto, and an arm member supporting the valve support and permitting a slight shifting of the valve support when the wastegate valve members are closed.

These and other features of the present invention will become apparent from the following description, with reference to the accompanying drawings, in which FIG. 1 is a side elevation view, partly in section, of a turbocharger provided with the exhaust gas bypass and wastegate valve arrangement according to the present invention;

Figure 1:
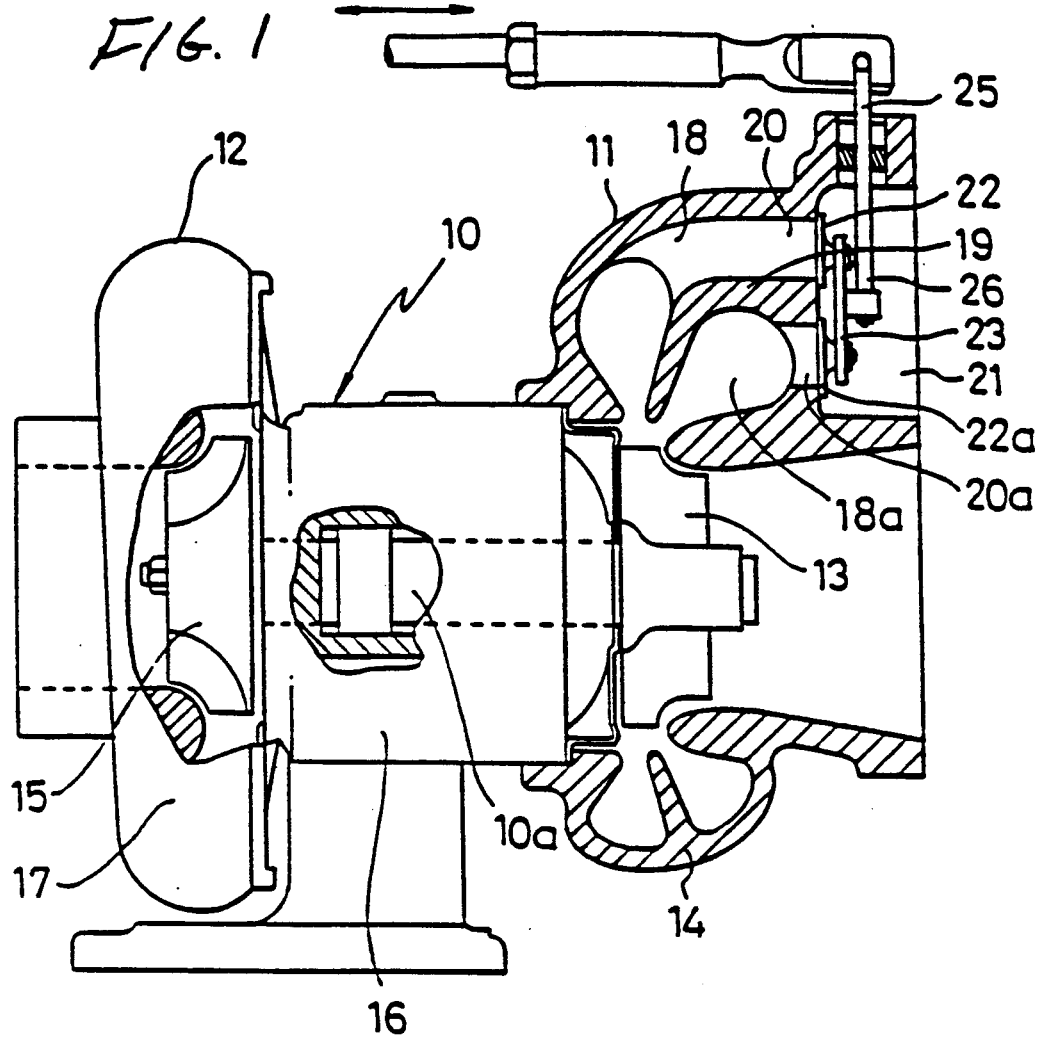

Referring to FIG. 1, a turbocharger 10, includes a turbine section 11 and a compressor section 12. The turbine section 11 includes a turbine wheel 13 rotated by exhaust gases, and a turbine housing 14 in which the turbine wheel 13 is housed. The compressor section 12 includes a compressor wheel 15 coupled through a coupling shaft 10a to the turbine wheel 13 for rotation by the turbine wheel 13. A compressor housing 17 is provided for housing the compressor wheel 15, and a center housing 16 is interposed between the compressor and turbine housings.

The turbine housing 14 defines separated inlet paths 18 and 18a for the exhaust gas of the internal combustion engine. A bulkhead 19 separates paths 18 and 18a so that the exhaust gases will be fed to the turbine wheel 13 in two streams for effectively transmitting the pressure impulses of the exhaust gas to the turbine wheel. The divided gas inlet paths 18 and 18a are provided for communication to atmosphere through a pair of bypass gas outlet ports 20 and 20a and a bypass passage 21. A pair of wastegate valve members 22 and 22a are provided for opening and closing the bypass gas outlet ports 20 and 20a.

Figure 2:
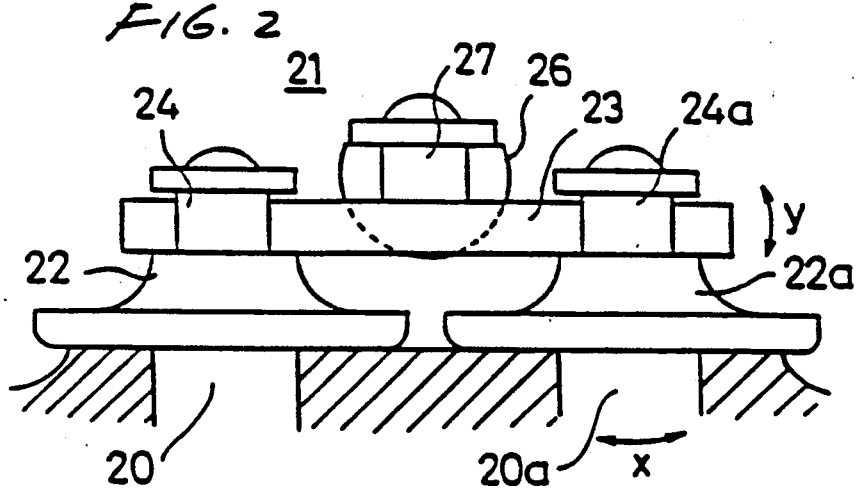
FIG. 2 is an enlarged, fragmentary view of the exhaust gas wastegate valve arrangement shown in FIG. 1.
Figure 3:
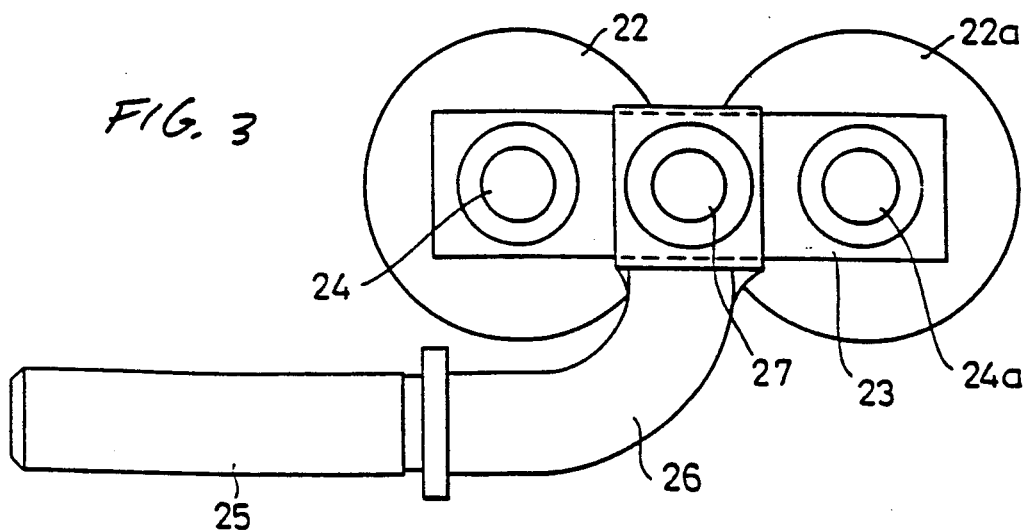
FIG. 3 is an enlarged, fragmentary plan view of the wastegate valve illustrated in FIG. 2.

Referring also to FIGS. 2 and 3, the pair of wastegate valve members 22 and 22a are mounted on a valve support 23 symmetrically with respect to the center of the support. A pair of mounting members 24 and 24a extend through the valve support 23 and secure wastegate valve members 22 and 22a with clearance to the support 23 for allowing the wastegate valve members 22 and 22a to shift slightly as they are opened and closed. An arm member 25 is coupled at its tip end 26 to the center of support 23 through a mounting member 27. In FIG. 2, the tip end 26 of the arm member 25 is formed in a semicircular shape in section and is engaged on its arcuate side to the top surface of the support 23 so that the support 23 can swing relative to arm 25 as the wastegate valve members are opened and closed. The mounting member 27 for the arm member 25 is provided with an abutment engaging the valve supporter 23 and bent at two extended ends into a downward L-shape (see in particular FIG. 3) to engage both side edges of the support 23 so that any rotation of this supporter 23 about the mounting member 27 in the same plane of the arm 25 will be restrained.

The arm member 25 extends through a flexible bushing in the housing and is coupled to a control arm 228 which per se is interlocked with a control means (not shown) of any known arrangement, so that the wastegate valve actuating system as in the above will be actuated.

In the exhaust gas bypass arrangement as has been described, the wastegate valve members 22 and 22a are respectively made slightly shiftable with respect to the valve supporter 23 in the direction shown by an arrow x in FIG. 2 and the valve support 23 in turn is swingable with respect to the arm member 25 as shown by an arrow y so that, upon seating of the respective wastegate valve members 22 and 22a onto the valve seats at the bypass gas outlet ports 20 and 20a, the wastegate valve members 22 and 22a will shift independently in a direction closing the ports even in the presence of any difference in height between the valve seats, or any pressure difference between the outlet ports 20 and 20a, and the wastegate valve members 22 and 22a are seated tightly substantially simultaneously. The semicircular tip end 26 of the arm member 25 causes a centering action so that the bypass valves 22 and 22a are closed against their valve seats reliably.

Figure 4:
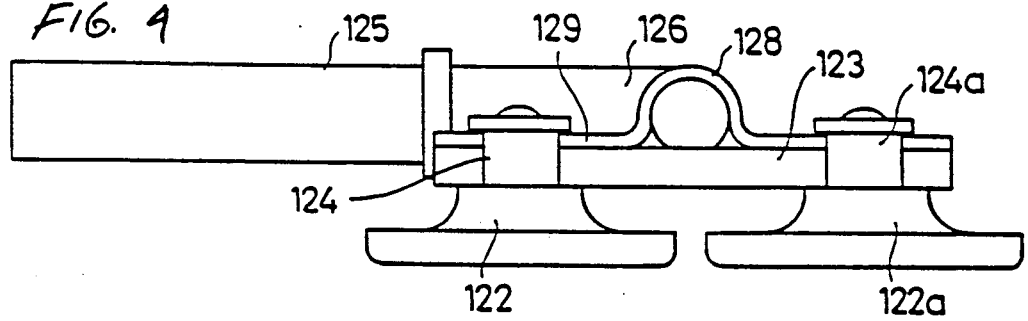
FIG. 4 is an enlarged, fragmentary side view of another embodiment of the wastegate valve of the present invention.
Figure 5:
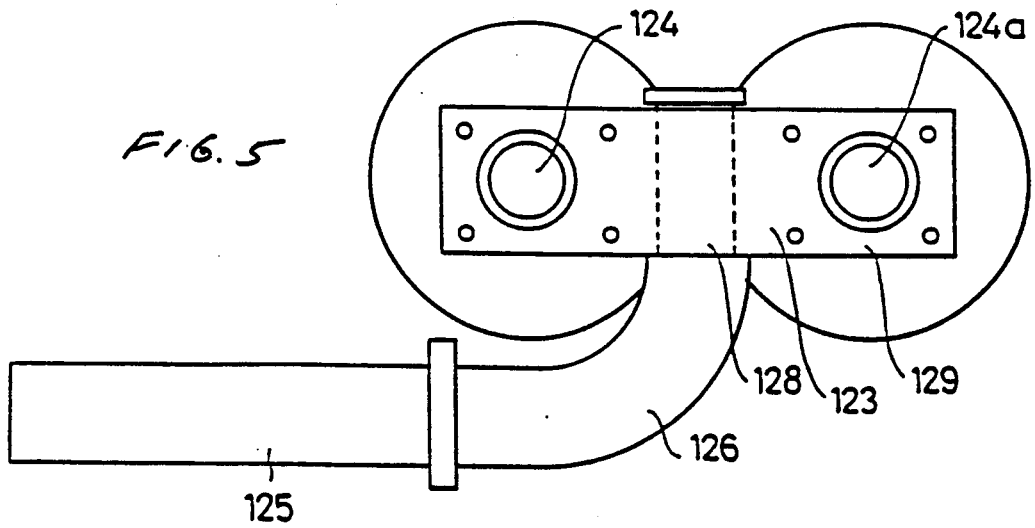
FIG. 5 is an enlarged, fragmentary plan view as magnified of the wastegate valve illustrated in FIG. 4.

In FIGS. 4 and 5, there is shown another embodiment of the present invention, in which an arm member 125 is mounted onto a support 123 through a flattened surface of a semicircular-shaped tip end 126 of the arm member 125. An overlaying strip 129 having an arcuately bent section 128 to conform to the surface of the tip end 126 is provided on the support 123 and extends across the tip end 126 of the arm member 125. Mounting members 124 and 124a are mounted on the support 123 and pass through both the support 123 and the overlaying strip 129, and wastegate valve members 122 and 122a are mounted to these mounting members 124 and 124a. As occasion demands, both end parts of the overlaying strip 129 may be rigidly secured to the support 123 by means of spot welding. The tip end 126 of the arm member 125 is in contact with the arcuate portion 128 of the overlaying strip 129 so that the support 123 and wastegate valve members 122 and 122a will be swingable with respect to the arm member 125 and the valves 122 and 122a can be simultaneously seated smoothly on the valve seats in the same manner as in the foregoing embodiment. In this arrangement, further, the tip end 126 includes portions facing the side edges of the support 123 so as to lockingly engage these side edges, so that the valve supporter 123 can be prevented from being rotated in the plane of the arm 125 in the same manner as in the foregoing embodiment.

Figure 6:
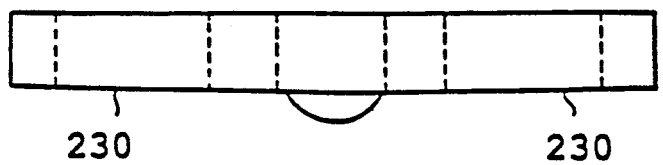
FIG. 6 is a side view of still another embodiment of the invention.
Figure 7:
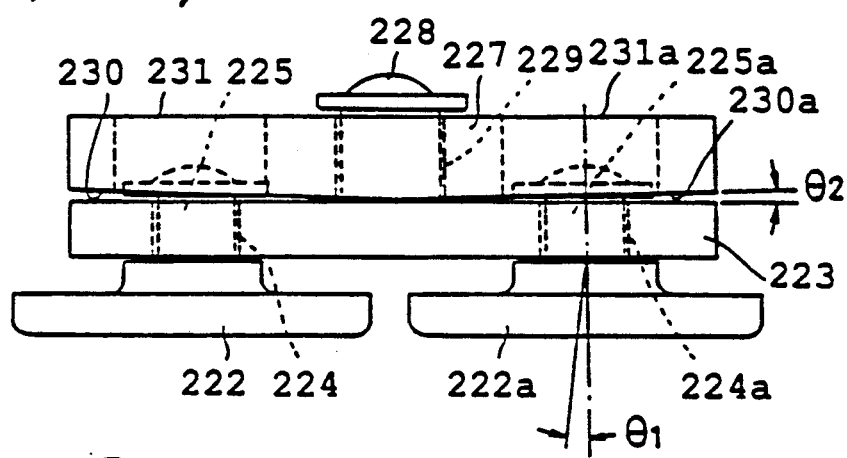
FIG. 7 is an end view of the embodiment illustrated in FIG. 6.
Figure 8:
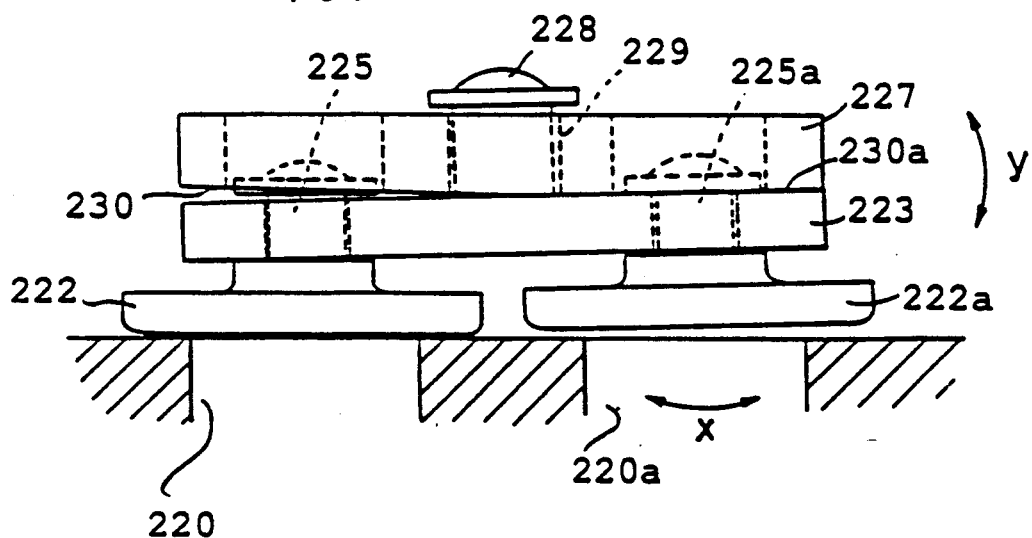
FIG. 8 is a view similar to FIG. 7 but illustrating the manner in which the wastegate valve members engage their corresponding valve seats.

Referring also to FIGS. 6 to 8, a pair of wastegate valve members 222 and 222a are supported by support 223, of which is rectangularly shaped in plan view, at symmetrical positions with respect to the center of support 223. The support 223 has holes 224 and 224a, and a pair of mounting members 225 and 225a are passed through holes 224 and 224a. The mounting members 225 and 225a are coupled to the wastegate valve members 222 and 222a. The holes 224 and 224a are of a diameter allowing the mounting members 225 and 225a and accordingly the bypass valves 222 and 22a to pivot by an angle $\phi_1$ with respect to the center line of each of the wastegate valve members 222 and 222a. At the center of the support 223, a holder 227 formed at the tip end of arm member 226 is coupled so as to allow the support 223 to be swingable with respect to the holder 227 by an angle $\phi_2$, which is smaller than the above angle $\phi_1$. Accordingly, the holder 227 is shaped to be substantially identical to the rectangular shape of the support 223, and a hole 229 extends through the center of holder 227 for receiving a mounting member 228.

The bottom surface of the holder 227 is formed to have tapered faces 230 and 230a with the thickness gradually reduced from the center of the holder to each of the opposite end portions, while the diameter of the holes 229 allow the mounting member 228 and eventually the support 223 to swing, the support 223 thus being swingable by the angle $\phi_2$ with respect to the holder 227. On both sides of the hole 229 of the holder 227, relief holes 231 and 231a are provided into which head portions of the mounting member 25 and 25a can freely engage. It is preferable that the mounting member 228 be provided with a restraining means extended in width direction of the holder section 27 and bent at extended ends downward into an L-shape so that such extended restraining means will engage lockingly both side edges of the support 23 so as to prevent it from rotating about the mounting member 23, and the center in the plane of the arm. The means for restraining the rotation of the support 23 may be of any other form so long as the valve supporter 23 is swingable by the smaller angle of $\phi_2$.

In the exhaust gas bypass arrangement as has described, the wastegate valve members 222 and 222a are swingable on the bottom surface of the support 223 by the relatively larger angle $\phi_1$ in the direction shown by an arrow x in FIG. 8, and the support 223 and eventually the wastegate valve members 222 and 222a pivot through the angle $\phi_2$, which is smaller than the foregoing angle $\phi_1$ in the direction shown by an arrow y in FIG. 8, so that the wastegate valve members 222 and 222a can be made to tightly seat on the valves seats simultaneously, even in an event where the gas outlet ports 220 and 220a are distorted at the valve seats, of when one of the wastegate valve members 222 and 222a is made to open to regulate pressure due to a difference in the pressure at the outlet ports 220 and 220a. The wastegate valve members 222 and 222a are shiftable in two directions and the swingable angle is set in the valve opening and closing directions, i.e., in the arrow y directions, so that any bumpy movement between the bypass valves 222 and 222a and the arm member is reduced.

I claim:

1. Exhaust gas driven turbocharger comprising a housing, a shaft mounted for rotation within said housing and defining a pair of opposite ends, a compressor wheel mounted on one end of the said shaft for compressing ambient air, a turbine wheel mounted on the opposite end of the said shaft and responsive to engine exhaust gases to turn said shaft and thereby turn said compressor wheel, a divided inlet passage for carrying exhaust gases to said turbine wheel, said divided inlet passage defining a pair of inlet passages, an outlet port in each of said passages for communicating each of the latter to ambient atmosphere thereby bypassing said turbine wheel, and a pair of wastegate valve members for closing each of said outlets, a support, a pair of mounting members securing each of said wastegate valve members to said support, an arm member for operating said support and said wastegate valve members, said arm member being pivotally connected to said support to permit shifting of said support relative to said arm to permit said wastegate valve members to close their corresponding outlet openings despite variations between the height of said ports and the pressure of the exhaust gas in said passages.

2. Turbocharger as claimed in claim 1, wherein said mounting members include portions engaging said support to permit flexing movement of said wastegate valve members relative to said support.

3. Turbocharger as claimed in claim 2, wherein said mounting members secure their corresponding wastegate valve members to said support at positions symmetrical with respect to the attachment of said arm to said supporter.

4. Turbocharger as claimed in claim 3, wherein said valve support and said arm member are coupled to each other through an arcuate surface inter posed between the arm member and the support.

5. Turbocharger as claimed in claim 4, wherein said wastegate valve members are mounted on one side of said support and said arm is mounted on the opposite side of said support.

6. Turbocharger as claimed in claim 5, wherein said support is a substantially flat plate having a pair of opposite sides, said wastegate valve members extending from one side of said plate and the arm being secured to the opposite of said plate.

7. Turbocharger as claimed in claim 6, wherein said plate has a pair of holes on opposite sides of the attachment between the arm and said plate, said mounting members being pins extending through said holes to permit said valve members to slide along the axis of said holes relative to said plate.

8. Turbocharger as claimed in claim 7, wherein said arm is secured to said support through a strip having an arcuate portion engaging said arm and secured to said support on opposite sides of the arcuate portion.

9. Turbocharger as claimed in claim 8, wherein said mounting members are received in said holes with clearance to permit said wastegate valve members to swing with respect to said support through a first predetermined maximum angle.

10. Turbocharger as claimed in claim 9, wherein said valve supporter includes a first portion secured to said arm and a second portion carrying said wastegate valve members, said second portion being swingable with respect to the first portion through a second predetermined angle.

11. Turbocharger as claimed in claim 10, wherein said second predetermined angle is smaller than said first predetermined angle.

* * * * *

UNITED STATES PATENT AND TRADEMARK OFFICE
CERTIFICATE OF CORRECTION

PATENT NO. : 5,046,317
DATED : September 10, 1991
INVENTOR(S) : Akira Satokawa

It is certified that error appears in the above-identified patent and that said Letters Patent is hereby corrected as shown below:

On the title page: Item [30] add:

```
--Foreign Application Priority Data

June 9, 1989   Japan   66846/1989
June 9, 1989   Japan   66847/1989--
```

Signed and Sealed this

Tenth Day of August, 1993

Attest:

MICHAEL K. KIRK

Attesting Officer     Acting Commissioner of Patents and Trademarks